(12) United States Patent
Ausen et al.

(10) Patent No.: US 8,758,882 B2
(45) Date of Patent: Jun. 24, 2014

(54) COMPOSITE LAYER

(75) Inventors: Ronald W. Ausen, St. Paul, MN (US); William J. Kopecky, Hudson, WI (US); Stephanie B. Castiglione, Hudson, WI (US); Ying-Yuh Lu, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 140 days.

(21) Appl. No.: 13/635,609

(22) PCT Filed: Mar. 8, 2011

(86) PCT No.: PCT/US2011/027546
§ 371 (c)(1), (2), (4) Date: Sep. 17, 2012

(87) PCT Pub. No.: WO2011/119324
PCT Pub. Date: Sep. 29, 2011

(65) Prior Publication Data
US 2013/0011638 A1    Jan. 10, 2013

Related U.S. Application Data

(60) Provisional application No. 61/317,484, filed on Mar. 25, 2010.

(51) Int. Cl.
| | | |
|---|---|---|
| *B32B 27/14* | (2006.01) | |
| *B32B 7/02* | (2006.01) | |
| *B32B 7/12* | (2006.01) | |
| *B32B 27/08* | (2006.01) | |
| *C09J 7/00* | (2006.01) | |
| *C09J 7/02* | (2006.01) | |

(52) U.S. Cl.
CPC ... *B32B 7/02* (2013.01); *B32B 7/12* (2013.01); *B32B 27/08* (2013.01); *C09J 7/00* (2013.01); *C09J 7/0225* (2013.01)
USPC .......... 428/198; 428/172; 428/212; 428/343; 428/355 R

(58) Field of Classification Search
CPC ............ B32B 7/02; B32B 7/12; B32B 27/08; C09J 7/00; C09J 7/0225
USPC ...................... 428/198, 172, 212, 343, 355 R
See application file for complete search history.

(56) References Cited

U.S. PATENT DOCUMENTS

| | | |
|---|---|---|
| 2,053,173 A | 9/1936 | Astima |
| 2,884,126 A | 4/1959 | Ulrich |

(Continued)

FOREIGN PATENT DOCUMENTS

| | | |
|---|---|---|
| EP | 0353064 | 1/1990 |
| EP | 0872580 | 10/1998 |

(Continued)

OTHER PUBLICATIONS

International Search Report for PCT/US2011/027546, 7 pages.

*Primary Examiner* — Betelhem Shewareged
(74) *Attorney, Agent, or Firm* — Gregory D. Allen

(57) ABSTRACT

Composite layer comprising a plurality of longitudinal first zones comprised of a first polymeric material alternating with a plurality of longitudinal second zones comprised of a second polymeric material such that one first zone is disposed between two adjacent second zones. The zones are generally parallel to one another, and at least one of each first zone or each second zone has a maximum width dimension of not greater than 2 mm. Adjacent first and second zones have an average pitch, wherein for the composite layer there is an average of said average pitches, and wherein the average pitch for any adjacent first and second zones is within 20 percent of the average pitch for adjacent first and second zones of said average of said average pitches.

20 Claims, 8 Drawing Sheets

(56) References Cited

U.S. PATENT DOCUMENTS

| Patent No. | Date | Name | Ref |
|---|---|---|---|
| 3,032,008 A | 5/1962 | Land | |
| 3,204,290 A | 9/1965 | Crompton | |
| 3,471,588 A | 10/1969 | Kanner | |
| 3,485,912 A | 12/1969 | Schrenk | |
| 3,524,789 A | 8/1970 | Olsen | |
| 4,426,344 A | 1/1984 | Dinter | |
| 4,621,898 A | 11/1986 | Cohen | |
| 4,669,965 A | 6/1987 | Murakami | |
| 5,017,116 A | 5/1991 | Carter | |
| 5,528,319 A | 6/1996 | Austin | |
| 5,620,780 A | 4/1997 | Krueger | |
| 5,648,166 A | 7/1997 | Dunshee | |
| 5,679,379 A | 10/1997 | Fabbricante | |
| 5,795,643 A | 8/1998 | Steininger | |
| 5,948,517 A | 9/1999 | Adamko | |
| 5,993,940 A | 11/1999 | Ouderkirk | |
| 6,144,319 A | 11/2000 | Lutz | |
| 6,171,985 B1 | 1/2001 | Joseph | |
| 6,210,776 B1 * | 4/2001 | Hill | 428/187 |
| 6,228,449 B1 | 5/2001 | Meyer | |
| 6,312,787 B1 | 11/2001 | Hayashi | |
| 6,348,249 B2 | 2/2002 | Meyer | |
| 6,352,761 B1 | 3/2002 | Hebrink | |
| 6,398,370 B1 | 6/2002 | Chiu | |
| 6,465,107 B1 | 10/2002 | Kelly | |
| 6,511,742 B1 | 1/2003 | Müssig | |
| 6,669,887 B2 | 12/2003 | Hilston | |
| 6,731,416 B2 | 5/2004 | Hazzard | |
| 6,765,550 B2 | 7/2004 | Janick | |
| 6,926,950 B2 * | 8/2005 | Fernfors et al. | 428/198 |
| 7,201,955 B2 | 4/2007 | Mac Master | |
| 7,467,873 B2 | 12/2008 | Clarke | |
| 2004/0208394 A1 | 10/2004 | Kurata | |
| 2005/0060849 A1 | 3/2005 | Vanbenschoten | |
| 2006/0044290 A1 | 3/2006 | Hurwitz | |
| 2006/0046158 A1 * | 3/2006 | Emslander et al. | 430/5 |
| 2007/0153119 A1 | 7/2007 | Bilbrey | |
| 2007/0154683 A1 | 7/2007 | Ausen | |
| 2008/0030631 A1 * | 2/2008 | Gallagher | 348/818 |
| 2009/0284836 A1 | 11/2009 | Boyd | |
| 2012/0102621 A1 * | 5/2012 | Rodriguez | 2/206 |
| 2013/0004723 A1 * | 1/2013 | Ausen et al. | 428/163 |
| 2013/0004729 A1 * | 1/2013 | Ausen et al. | 428/172 |
| 2013/0009336 A1 | 1/2013 | Ausen | |
| 2013/0011600 A1 * | 1/2013 | Ausen et al. | 428/76 |

FOREIGN PATENT DOCUMENTS

| | | |
|---|---|---|
| EP | 1757429 | 2/2007 |
| WO | WO 96-11750 | 4/1996 |
| WO | WO 96-39349 | 12/1996 |
| WO | WO 01-45918 | 6/2001 |
| WO | WO 2004-091896 | 10/2004 |
| WO | WO 2007-118122 | 10/2007 |
| WO | WO 2009-050505 | 4/2009 |
| WO | WO 2011-008396 | 1/2011 |
| WO | WO 2011-119309 | 9/2011 |

* cited by examiner

COMPOSITE LAYER

CROSS REFERENCE TO RELATED APPLICATIONS

This application is a national stage filing under 35 U.S.C. 371 of PCT/US2011/027546, filed Mar. 8, 2011, which claims priority to U.S. Provisional Application No. 61/317484, filed Mar. 25, 2010, the disclosure of which is incorporated by reference in its/their entirety herein.

BACKGROUND

Extrusion of multiple polymeric materials into a single layer or film is known in the art. For example, multiple polymeric flow streams have been combined in a die or feedblock in a layered fashion to provide a multilayer film having multiple layers stacked one on top of the other. It is also known, for example, to provide more complicated extruded film structures where the film is partitioned, not as a stack of layers in the thickness direction, but as stripes disposed side-by-side along the width dimension of the film.

SUMMARY

For example, co-pending and co-assigned U.S. Pat. Appl. having Ser. 61/221,839, filed Jun. 30, 2009, "Extrusion Die Element, Extrusion Die and Method for Making Multiple Stripe Extrudate from Multilayer Extrudate," Ausen et al., can produce side-by-side striped films with stripes having widths of 50 mils (1.27 mm) or less. However, some desirable applications would require stripes with a more precise boundary between adjacent stripes.

There is a need for further improvements in such devices for extruding multiple stripe films.

In one aspect, the present disclosure provides a composite layer comprising a plurality of longitudinal first zones comprised of a first polymeric material alternating with a plurality of longitudinal second zones comprised of a second polymeric material such that one first zone is disposed between two adjacent second zones, wherein the zones are generally parallel to one another, and at least one of each first zone or each second zone has a maximum width dimension of not greater than 2 mm (in some embodiments, not greater than 1.5 mm, 1 mm, 0.75 mm, 0.5 mm, or even not greater than 0.2 mm; in some embodiments, in a range from 0.25 mm to 1 mm), wherein adjacent first and second zones have an average pitch (an exemplary pitch is shown FIG. 5 as $p_5$), wherein for the composite layer there is an average of said average pitches, and wherein the average pitch for any adjacent first and second zones is within 20 (in some embodiments, 15, 10, or even within 5) percent of the average pitch for adjacent first and second zones of said average of said average pitches. In some embodiments, there are at least 10 (in some embodiments, at least 15, 20, 25, 30, 35, 40, 45, 50, 55, 60, 65, 70, 75, 80, 85, 90, 95, or even at least 100) distinct first and second zones per cm. In some embodiments, each first zone has an average width, wherein there is an average width of the first zones, and wherein said average width dimension of first zones is within 20 (optionally, 15, 10, or even within 5) percent of said average width for the first zone. Measurements of dimensions are determined using an average of 10 random measurements.

In another aspect, the present disclosure provides a composite layer comprising:

a first plurality of longitudinal first zones comprised of a first polymeric material alternating with a plurality of longitudinal second zones comprised of a second polymeric material such that one first zone is disposed between two adjacent second zones, wherein the zones are generally parallel to one another, and at least one of each first zone or each second zone has a maximum width dimension of not greater than 2 mm (in some embodiments, not greater than 1.5 mm, 1 mm, 0.75 mm, 0.5 mm, or even not greater than 0.2 mm; in some embodiments, in a range from 0.25 mm to 1 mm), wherein adjacent first and second zones in the first plurality have an average pitch, and wherein for the first plurality there is an average of said average pitches; and a second plurality of longitudinal first zones comprised of the first polymeric material alternating with a plurality of longitudinal second zones comprised of the second polymeric material such that one first zone is disposed between two adjacent second zones, wherein the zones are generally parallel to one another, and at least one of each first zone or each second zone has a maximum width dimension of not greater than 2 mm (in some embodiments, not greater than 1.5 mm, 1 mm, 0.75 mm, 0.5 mm, or even not greater than 0.2 mm; in some embodiments, in a range from 0.25 mm to 1 mm), wherein adjacent first and second zones in the first plurality have an average pitch, and wherein for the second plurality there is an average of said average pitches, wherein for the composite layer there is an average of said average pitches of the first and second average pitches, wherein the average pitch for adjacent first and second zones in each of the first and second plurality is within 20 (in some embodiments 15, 10, or even less than 5) percent of said average of said average pitches, and wherein there is a third zone comprising the first or second polymeric material separating the first and second pluralities having a width wider than said average of said average pitches. In some embodiments, each first zone has an average width, wherein there is an average width of the first zones, and wherein said average width dimension of first zones is within 20 (in some embodiments, 15, 10, or even within 5) percent of said average width for the first zone. In some embodiments, there are at least 10 (in some embodiments, at least 15, 20, 25, 30, 35, 40, 45, 50, 55, 60, 65, 70, 75, 80, 85, 90, 95, or even at least 100) distinct first and second zones per cm. In some embodiments there may be an additional (e.g., a third) plurality(s) of longitudinal first zones.

Advantages of composite layers described herein are they have relatively precise patterns of first and second polymers and/or at least one relatively small dimension.

DETAILED DESCRIPTION

Figure 1:
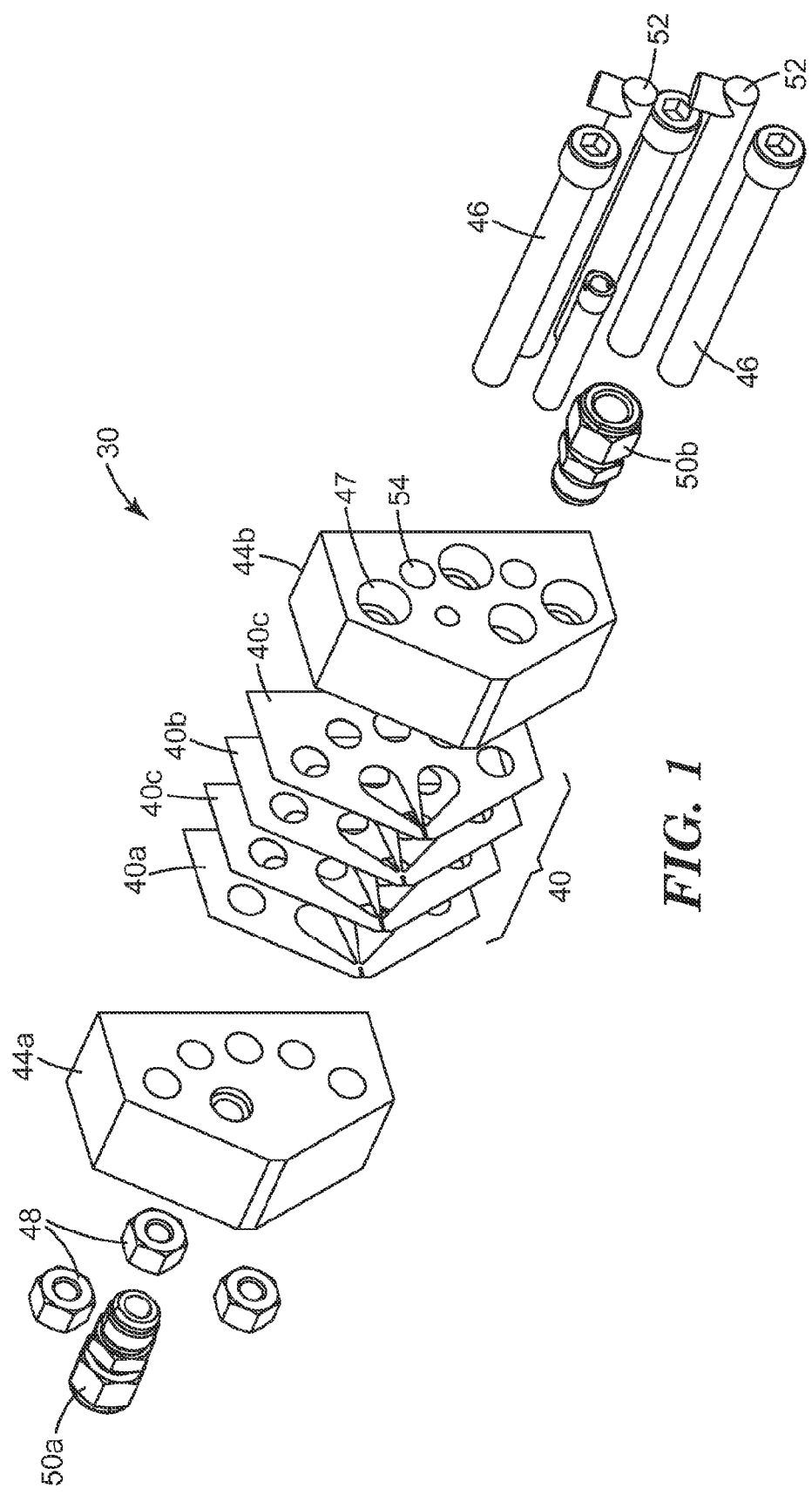
FIG. 1 is an exploded perspective view of an exemplary embodiment of a set of extrusion die elements for making composite layers described herein, including a plurality of shims, a set of end blocks, bolts for assembling the components, and inlet fittings for the materials to be extruded.

In some embodiments, extrusion dies used herein comprise a plurality of shims positioned adjacent to one another, the shims together defining a first cavity, a second cavity, and an die slot, wherein the die slot has a distal opening wherein each of the plurality of shims defines a portion of the distal opening, wherein at least a first one of the shims provides a passageway between the first cavity and the die slot, wherein at least a second one of the shims provides a passageway between the second cavity and the die slot, and wherein the shims that provide a passageway between the second cavity and the die slot have first and second opposed major surfaces, and wherein the passageway extends from the first major surface to the second major surface.

In some embodiments, extrusion dies used herein comprise a plurality of shims positioned adjacent to one another, the shims together defining a first cavity, a second cavity, and an die slot, wherein the die slot has a distal opening, wherein each of the plurality of shims defines a portion of the distal opening, wherein at least a first one of the shims provides a passageway between the first cavity and the die slot, wherein at least a second one of the shims provides a passageway between the second cavity and the die slot, wherein the shims each have first and second opposed major surfaces and a thickness perpendicular to the major surfaces, and wherein the passageways extend completely through the thickness of the respective shim.

In some embodiments, extrusion dies used herein comprise a plurality of shims positioned adjacent to one another, the shims together defining a first cavity, a second cavity, and an die slot, wherein the die slot has a distal opening, wherein each of the plurality of shims defines a portion of the distal opening, wherein at least a first one of the shims provides a conduit between the first cavity and the die slot, wherein at least a second one of the shims provides a conduit between the second cavity and the die slot, and wherein if a fluid having a viscosity of 300 Pa*s at 220° C. is extruded through the extrusion die, the fluid has a shear rate of less than 2000/sec.

In some embodiments, extrusion dies used herein comprise a plurality of shims positioned adjacent to one another, the shims together defining a first cavity, a second cavity, and an die slot, wherein the die slot has a distal opening, wherein each of the plurality of shims defines a portion of the distal opening, wherein at least a first one of the shims provides a passageway between the first cavity and the die slot, wherein at least a second one of the shims provides a passageway between the second cavity and the die slot, and wherein at least one of the shims is a spacer shim providing no conduit between either the first or the second cavity and the die slot.

In general, a method of making a composite layer described herein comprises:

providing an extrusion die described herein arranged to provide the desired composite layer configuration;

supplying a first extrudable polymeric material into the first cavity;

supplying a second extrudable polymeric material into the second cavity; and extruding the first and second polymeric materials through the die slot and through the distal opening to provide a composite layer.

In some embodiments a method of making a composite layer described herein comprises:

providing an extrusion die described herein arranged to provide the desired composite layer configuration, the extrusion die comprising a plurality of shims positioned adjacent to one another, the shims together defining a first cavity, a second cavity, and an die slot, wherein the die slot has a distal opening, wherein each of the plurality of shims defines a portion of the distal opening, wherein at least a first one of the shims provides a conduit between the first cavity and the die slot, wherein at least a second one of the shims provides a conduit between the second cavity and the die slot;

supplying a first extrudable polymeric material into the first cavity;

supplying a second extrudable polymeric material into the second cavity; and extruding the first and second polymeric materials through the die slot and through the distal opening to provide the composite layer comprising at least one distinct region of the first polymeric material and at least one distinct region of the second polymeric material.

Typically, not all of the shims have passageways; some may be spacer shims that provide no conduit between either the first or the second cavity and the die slot. The number of shims providing a passageway between the first cavity and the die slot may be equal or unequal to the number of shims providing a passageway between the second cavity and the die slot.

In some embodiments, extrusion dies described herein include a pair of end blocks for supporting the plurality of shims. In these embodiments it may be convenient for one or all of the shims to each have one or more through-holes for the passage of connectors between the pair of end blocks. Bolts disposed within such through-holes are one convenient expedient for assembling the shims to the end blocks, although the ordinary artisan may perceive other alternatives for assembling the extrusion die. In some embodiments, the at least one end block has an inlet port for introduction of fluid material into one or both of the cavities.

In some embodiments, the shims will be assembled according to a plan that provides a repeating sequence of shims of diverse types. The repeating sequence can have two or more shims per repeat. For a first example, a two-shim repeating sequence could comprise a shim that provides a conduit between the first cavity and the die slot and a shim that provides a conduit between the second cavity and the die slot. For a second example, a four-shim repeating sequence could comprise a shim that provides a conduit between the first cavity and the die slot, a spacer shim, a shim that provides a conduit between the second cavity and the die slot, and a spacer shim.

The shape of the passageways within, for example, a repeating sequence of shims, may be identical or different. For example, in some embodiments, the shims that provide a conduit between the first cavity and the die slot might have a flow restriction compared to the shims that provide a conduit between the second cavity and the die slot. The width of the distal opening within, for example, a repeating sequence of shims, may be identical or different.

The shape of the die slot within, for example, a repeating sequence of shims, may be identical or different. For example a 4-shim repeating sequence could be employed having a shim that provides a conduit between the first cavity and the die slot, a spacer shim, a shim that provides a conduit between the second cavity and the die slot, and a spacer shim, wherein the shims that provide a conduit between the second cavity and the die slot have a narrowed passage displaced from both edges of the distal opening.

In some embodiments, the assembled shims (conveniently bolted between the end blocks) are further clamped within a manifold body. The manifold body has at least one (or more; usually two) manifold therein, the manifold having an outlet. An expansion seal (e.g., made of copper) is disposed so as to seal the manifold body and the shims, such that the expansion seal defines a portion of at least one of the cavities (in some embodiments, a portion of both the first and second cavities), and such that the expansion seal allows a conduit between the manifold and the cavity.

In some embodiments of dies described herein, the first passageway has a first average length and a first average minor perpendicular dimension, wherein the ratio of the first average length to the first average minor perpendicular dimension is in a range from 200:1 (in some embodiments, 150:1, 100:1, 75:1, 50:1, or even 10:1) to greater than 1:1 (in some embodiments, 2:1) (typically, 50:1 to 2:1), wherein the second passageway has a second average length and a second average minor perpendicular dimension, and wherein the ratio of the second average length to the second average minor perpendicular dimension is in a range from 200:1 (in some embodiments, 150:1, 100:1, 75:1, 50:1, or even 10:1) to greater than 1:1 (in some embodiments, 2:1) (typically, 50:1 to 2:1).

In some embodiments of dies described herein, if a fluid having a viscosity of 300 Pa*s at 220° C. is extruded through the extrusion die, the fluid has a shear rate of less than 2000/sec, wherein the viscosity is determined using a capillary rheometer (available from Rosand Precision Ltd., West Midland, England, under the trade designation "Advanced Rheometer System"; Model RH-2000).

In accordance with another aspect of the present disclosure, a method of making a composite layer is provided, the method comprising: providing an extrusion die comprising a plurality of shims positioned adjacent to one another, the shims together defining a first cavity, a second cavity, and an die slot, wherein the die slot has a distal opening, wherein each of the plurality of shims defines a portion of the distal opening, wherein at least a first one of the shims provides a conduit between the first cavity and the die slot, wherein at least a second one of the shims provides a conduit between the second cavity and the die slot; supplying a first extrudable polymeric material into the first cavity; supplying a second extrudable polymeric material into the second cavity; extruding the first and second polymeric materials through the die slot and through the distal opening to provide the composite layer comprising at least one distinct region of the first polymeric material and at least one distinct region of the second polymeric material. As used in this context, "extrudable polymeric material" refers to polymeric material with 100 percent solids when extruded.

In practicing the method, the first and second polymeric materials might be solidified simply by cooling. This can be conveniently accomplished passively by ambient air, or actively by, for example, quenching the extruded first and second polymeric materials on a chilled surface (e.g., a chilled roll). In some embodiments, the first and/or second polymeric materials are low molecular weight polymers that need to be cross-linked to be solidified, which can be done, for example, by electromagnetic or particle radiation.

In some embodiments, the die distal opening has an aspect ratio of at least 100:1 (in some embodiments, at least 500:1, 1000:1, 2500:1, or even at least to 5000 to 1).

Methods described herein can be operated at diverse pressure levels, but for many convenient molten polymer operations the first polymeric materials in the first cavities and/or the polymeric materials in the second cavities are kept at a pressure greater than 100 psi (689 kPa). The amount of material being throughput via the first and second cavities may be equal or different. In particular, by volume, the ratio of the first polymeric material passing through the distal opening to the second polymeric material passing through the distal opening can be over 5:1, 10:1, 20:1, 25:1, 50:1, 75:1, or even over 100:1.

The method may be operated over a range of sizes for the die slot. In some embodiments, it may be convenient for the first and second polymeric materials not to remain in contact while unsolidified for longer than necessary. It is possible to operate embodiments of methods of the present disclosure such that the first polymeric material and the second polymeric material contact each other at a distance not greater than 25 mm (in some embodiments, not greater than 20 mm, 15 mm, 10 mm, 5 mm, or even not greater than 1 mm) from the distal opening. The method may be used to prepare a composite layer having a thickness in a range from 0.025 mm to 1 mm.

Referring to FIG. 1, an exploded view of an exemplary embodiment of an extrusion die 30 according to the present disclosure is illustrated. Extrusion die 30 includes plurality of shims 40. In some embodiments, there will be a large number of very thin shims 40 (typically several thousand shims; in some embodiments, at least 1000, 2000, 3000, 4000, 5000, 6000, 7000, 8000, 9000, or even at least 10,000), of diverse types (shims 40a, 40b, and 40c), compressed between two end blocks 44a and 44b. Conveniently, fasteners (e.g., through bolts 46 threaded onto nuts 48) are used to assemble the components for extrusion die 30 by, passing through holes 47. Inlet fittings 50a and 50b are provided on end blocks 44a and 44b respectively to introduce the materials to be extruded into extrusion die 30. In some embodiments, inlet fittings 50a and 50b are connected to melt trains of conventional type. In some embodiments, cartridge heaters 52 are inserted into receptacles 54 in extrusion die 30 to maintain the materials to be extruded at a desirable temperature while in the die.

Figure 2:
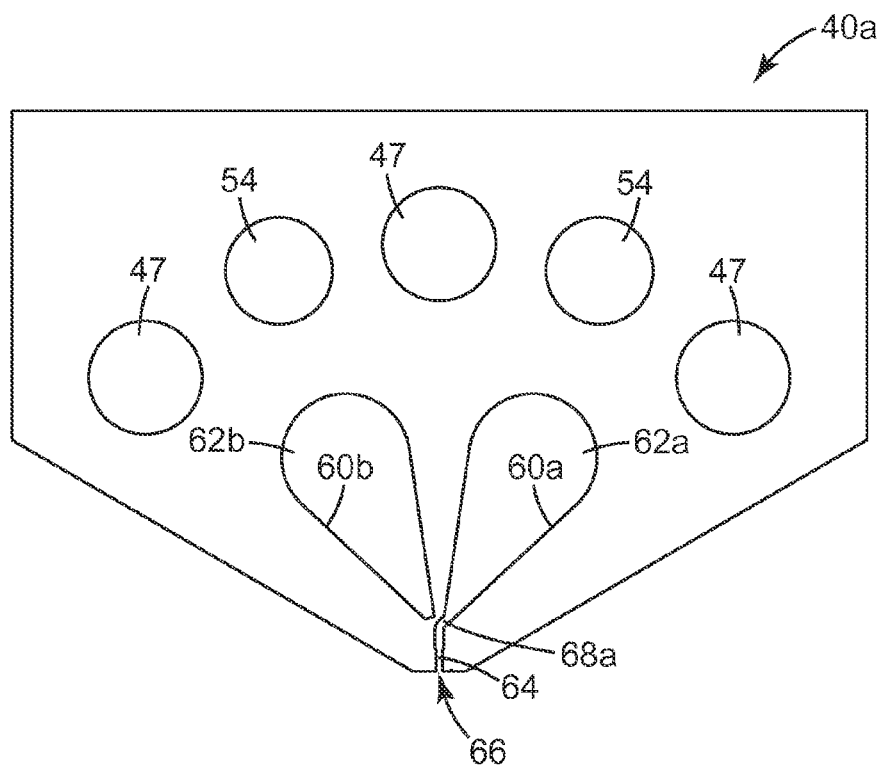
FIG. 2 is a plan view of one of the shims of FIG. 1.

Referring now to FIG. 2, a plan view of shim 40*a* from FIG. 1 is illustrated. Shim 40*a* has first aperture 60*a* and second aperture 60*b*. When extrusion die 30 is assembled, first apertures 60*a* in shims 40 together define at least a portion of first cavity 62*a*. Similarly, second apertures 60*b* in shims 40 together define at least a portion of second cavity 62*b*. Material to be extruded conveniently enters first cavity 62*a* via inlet port 50*a*, while material to be extruded conveniently enters second cavity 62*b* via inlet port 50*b*. Shim 40*a* has die slot 64 ending in slot 66. Shim 40*a* further has a passageway 68*a* affording a conduit between first cavity 62*a* and die slot 64. In the embodiment of FIG. 1, shim 40*b* is a reflection of shim 40*a*, having a passageway instead affording a conduit between second cavity 62*b* and die slot 64.

Figure 3:
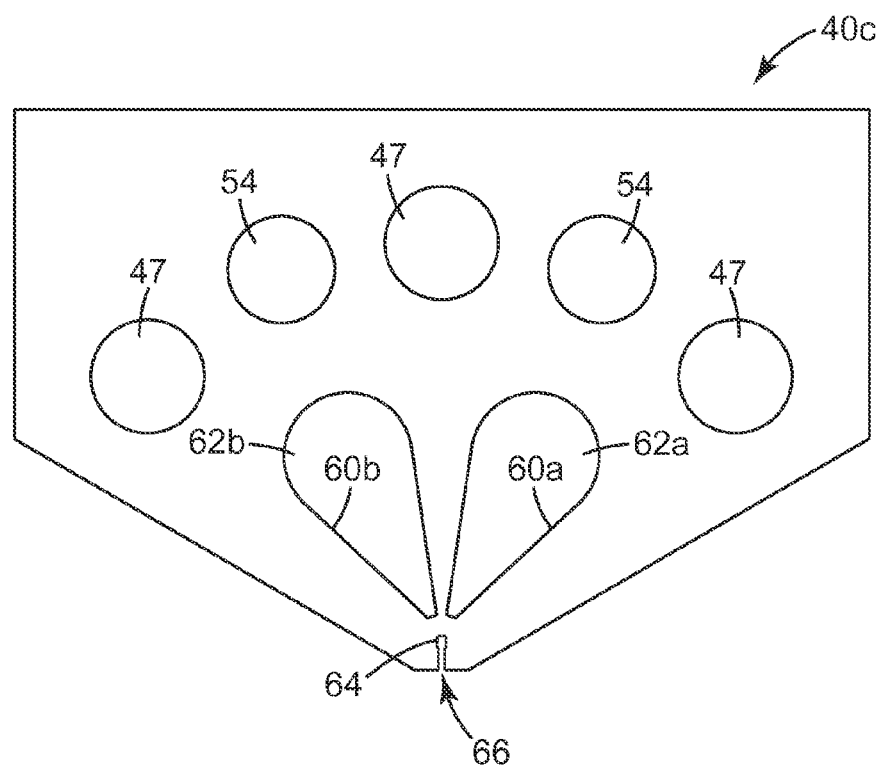
FIG. 3 is a plan view of a different one of the shims of FIG. 1

Referring now to FIG. 3, a plan view of shim 40*c* from FIG. 1 is illustrated. Shim 40*c* has no conduit between either of first or second cavities 62*a* and 62*b*, respectively, and die slot 64.

Figure 4:
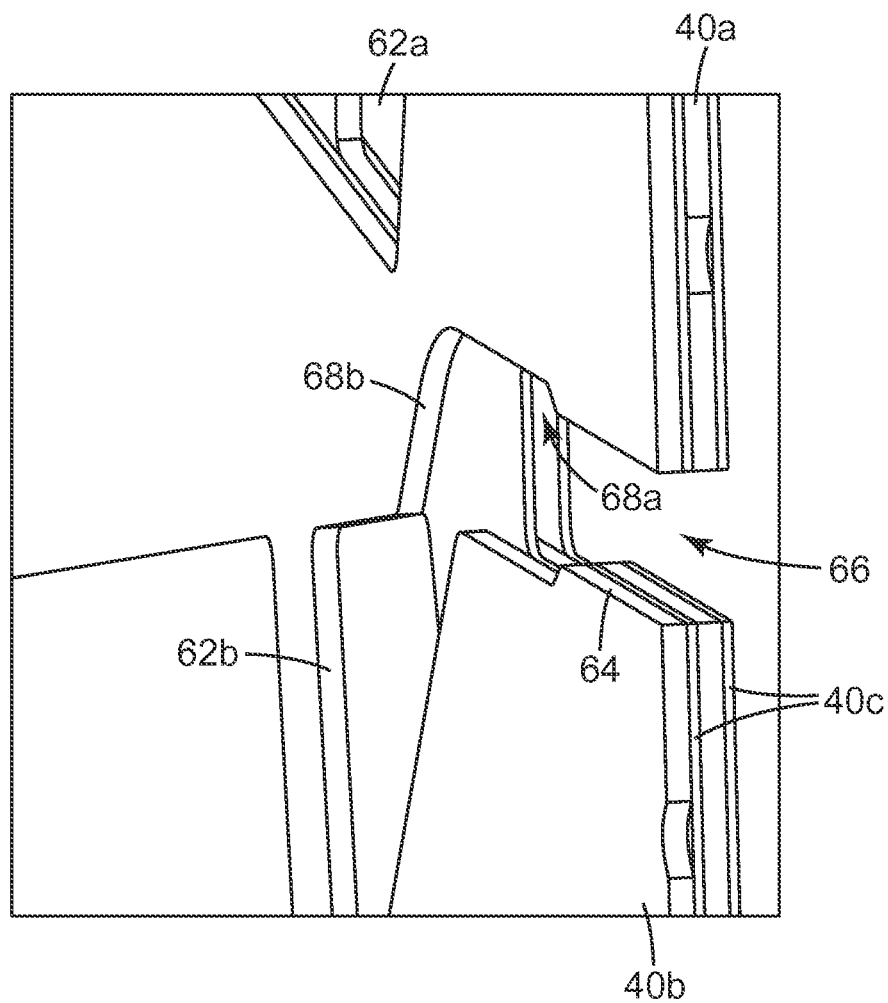
FIG. 4 is a perspective partial cutaway detail view of a segment of die slot of the assembled die according to FIG. 1, showing four adjacent shims which together form a repeating sequence of shims.

Referring now to FIG. 4, a perspective partial cutaway detail view of a segment of die slot assembled die similar to die 30 of FIG. 1 according to FIG. 1, showing four adjacent shims which together conveniently form a repeating sequence of shims, is illustrated. First in the sequence from left to right as the view is oriented is shim 40*b*. In this view, passageway 68*b*, which leads to a portion of cavity 62*b*, can be seen. Second in the sequence is a spacer shim 40*c*. Third in the sequence is shim 40*a*. Although not visualized in FIG. 4, shim 40*a* has passageway 68*a*, leading upwards as the drawing is oriented, providing a conduit with first cavity 62*a*. Fourth in the sequence is second spacer shim 40*c*. When die 30 is assembled with shims of this type in this way, and two flowable polymer containing compositions are introduced under pressure to cavities 62*a* and 62*b*, then co-extruded composite layer generally as depicted in FIG. 5 is produced.

Figure 5:
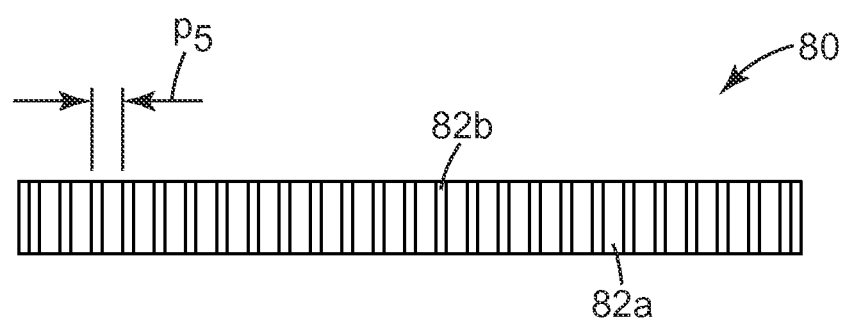
FIG. 5 is a cross-section view of a composite layer produced by a die assembled as depicted in FIG. 4, the section line being in the cross-web direction.

Referring now to FIG. 5, a cross-section view of a composite layer produced by a die assembled as depicted in FIG. 4 is illustrated. The section line for FIG. 5 is in the cross-web direction of the finished composite layer. Composite layer 80 has sharply vertical stripes of alternating materials, material 82*a* having been dispensed from cavity 62*a*, and material 82*b* having been dispensed from cavity 62*b* in FIG. 4.

Figure 6:
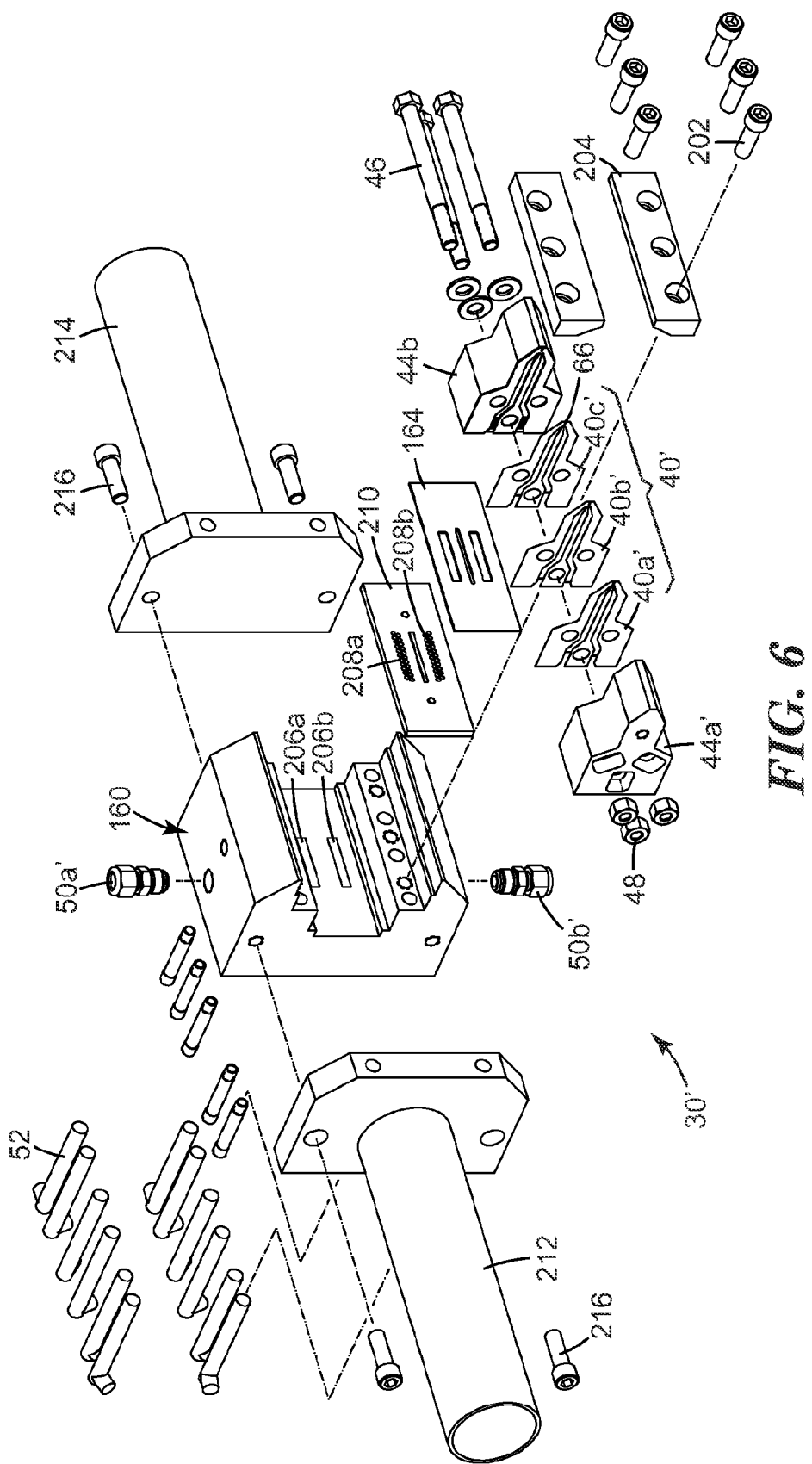
FIG. 6 is an exploded perspective view of an alternate exemplary embodiment of an extrusion die, wherein the plurality of shims, a set of end blocks, bolts for assembling the components, and inlet fittings for the materials to be extruded are clamped into a manifold body.

Referring now to FIG. 6, a perspective exploded view of an alternate embodiment of extrusion die 30' according to the present disclosure is illustrated. Extrusion die 30' includes plurality of shims 40'. In the depicted embodiment, there are a large number of very thin shims 40', of diverse types (shims 40*a'*, 40*b'*, and 40*c'*), compressed between two end blocks 44*a'* and 44*b'*. Conveniently, through bolts 46 and nuts 48 are used to assemble the shims 40' to the end blocks 44*a'* and 44*b'*.

In this embodiment, the end blocks 44*a'* and 44*b'* are fastened to manifold body 160, by bolts 202 pressing compression blocks 204 against the shims 40' and the end blocks 44*a'* and 44*b'*. Inlet fittings 50*a'* and 50*b'* are also attached to manifold body 160. These are in a conduit with two internal manifolds, of which only the exits 206*a* and 206*b* are visible in FIG. 6. Molten polymeric material separately entering body 160 via inlet fittings 50*a'* and 50*b'* pass through the internal manifolds, out the exits 206*a* and 206*b*, through passages 208*a* and 208*b* in alignment plate 210 and into openings 168*a* and 168*b* (seen in FIG. 7).

An expansion seal 164 is disposed between the shims 40' and the alignment plate 210. Expansion seal 164, along with the shims 40' together define the volume of the first and the second cavities (62*a* and 62*b* in FIG. 7). The expansion seal withstands the high temperatures involved in extruding molten polymer, and seals against the possibly slightly uneven rear surface of the assembled shims 40'. Expansion seal 164 may made from copper, which has a higher thermal expansion constant than the stainless steel conveniently used for both the shims 40' and the manifold body 160. Another useful expansion seal 164 material includes a polytetrafluoroethylene (PTFE) gasket with silica filler (available from Garlock Sealing Technologies, Palmyra, N.Y., under the trade designation "GYLON 3500" and "GYLON 3545").

Cartridge heaters 52 may be inserted into body 160, conveniently into receptacles in the back of manifold body 160 analogous to receptacles 54 in FIG. 1. It is an advantage of the embodiment of FIG. 6 that the cartridge heaters are inserted in the direction perpendicular to slot 66, in that it facilitates heating the die differentially across its width. Manifold body 160 is conveniently gripped for mounting by supports 212 and 214, and is conveniently attached to manifold body 160 by bolts 216.

Figure 7:
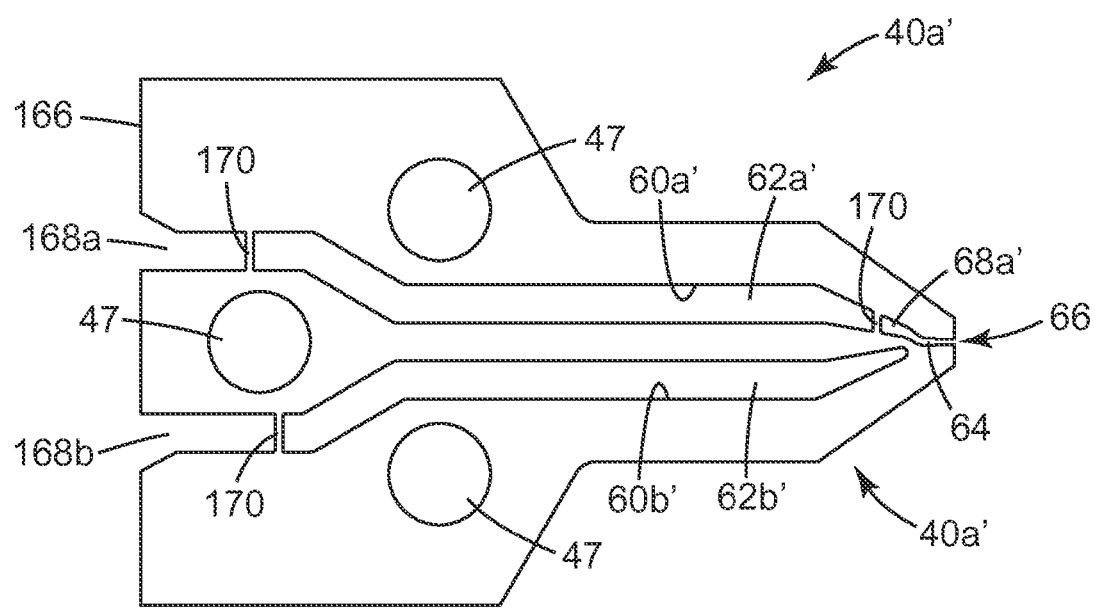
FIG. 7 is a plan view of one of the shims of FIG. 6, and relates to FIG. 6 in the same way FIG. 2 relates to FIG. 1.

Referring now to FIG. 7, a plan view of shim 40*a'* from FIG. 6 is illustrated. Shim 40*a'* has first aperture 60*a'* and second aperture 60*b'*. When extrusion die 30' is assembled, first apertures 60*a'* in shims 40' together define at least a portion of first cavity 62*a'*. Similarly, second apertures 60*b'* in shims 40' together define at least a portion of first cavity 62*a'*. Base end 166 of shim 40*a'* contacts expansion seal 164 when extrusion die 30' is assembled. Material to be extruded conveniently enters first cavity 62*a* via apertures in expansion seal 164 and via shim opening 168*a*. Similarly, material to be extruded conveniently enters first cavity 62*a* via apertures in expansion seal 164 and via shim opening 168*a*.

Shim 40*a'* has die slot 64 ending in slot 66. Shim 40*a'* further has passageway 68*a'* affording a conduit between first cavity 62*a'* and die slot 64. In the embodiment of FIG. 6, shim 40*b'* is a reflection of shim 40*a'*, having a passageway instead affording a conduit between second cavity 62*b'* and die slot 64. It might seem that strength members 170 would block the adjacent cavities and passageways, but this is an illusion—the flow has a route in the perpendicular-to-the-plane-of-the-drawing dimension when extrusion die 30' is completely assembled.

Figure 8:
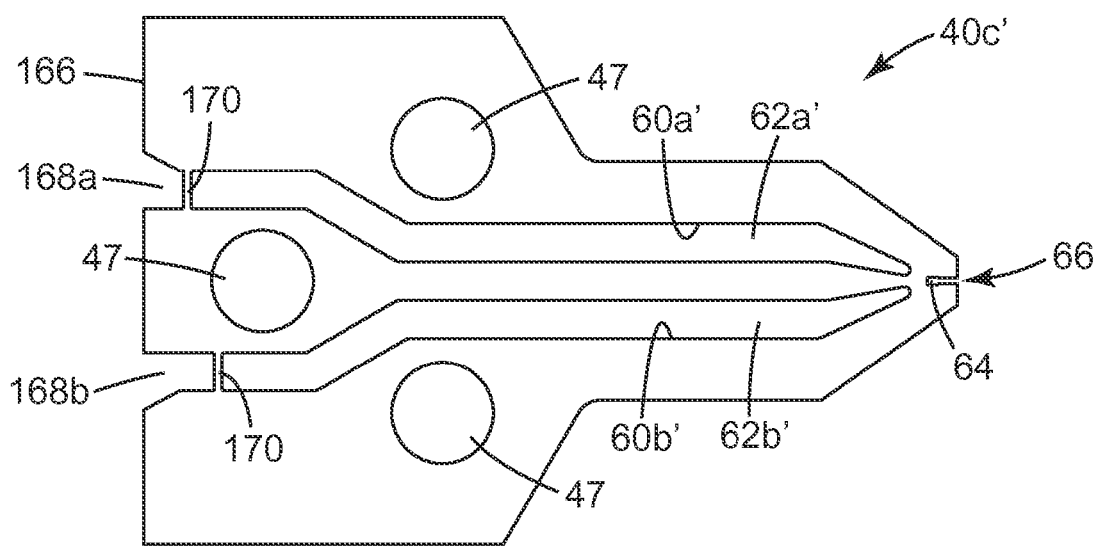
FIG. 8 is a plan view of a different one of the shims of FIG. 6, and relates to FIG. 6 in the same way FIG. 3 relates to FIG. 1.

Referring now to FIG. 8, a plan view of shim 40*c'* from FIG. 6 is illustrated. Shim 40*c'* has no conduit between either of first or the second cavities 62*a'* and 62*b'*, respectfully, and die slot 64.

Figure 9:
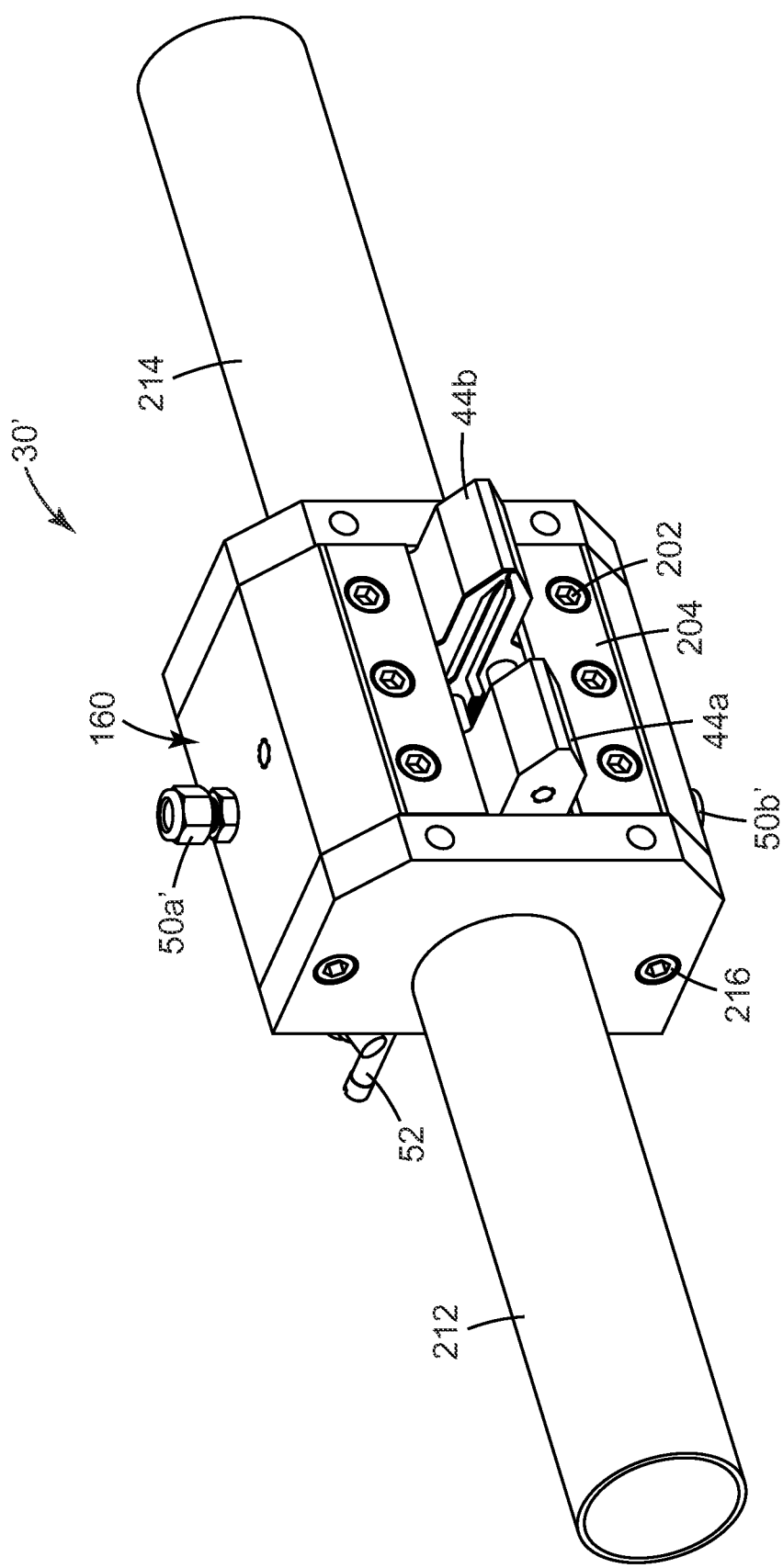
FIG. 9 is a perspective view of the embodiment of FIG. 6 as assembled.
Figure 14:
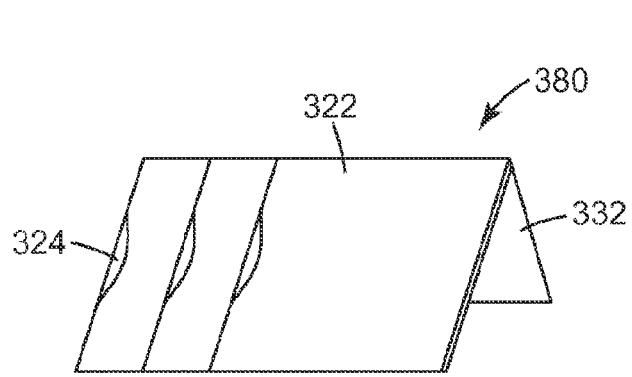
FIG. 14 is a perspective view of an illustrative privacy article adapted to protect multiple credit cards, and adapted to be received within a wallet.

Referring now to FIG. 9, a perspective view of the extrusion die 30' of FIG. 14 is illustrated in an assembled state, except for most of the shims 40' which have been omitted to allow the visualization of internal parts. Although the embodiment of FIG. 6 and FIG. 9 is more complicated than the embodiment of FIG. 1, it has several advantages. First, it allows finer control over heating. Second, the use of manifold body 160 allows shims 40' to be center-fed, increasing side-to-side uniformity in the extruded film. Third, the forwardly protruding shims 40' allow distal opening 66 to fit into tighter locations on crowded production lines. The shims are typically 0.05 mm (2 mils) to 0.25 mm (10 mils) thick, although other thicknesses, including, for example, those from 0.025 mm (1 mil) to 1 mm (40 mils) may also be useful. Each individual shim is generally of uniform thickness, preferably with less than 0.005 mm (0.2 mil), more preferably, less than 0.0025 mm (0.1 mil) in variability.

The shims are typically metal, preferably stainless steel. To reduce size changes with heat cycling, metal shims are preferably heat-treated.

The shims can be made by conventional techniques, including wire electrical discharge and laser machining Often, a plurality of shims are made at the same time by stacking a plurality of sheets and then creating the desired openings simultaneously. Variability of the flow channels is preferably within 0.025 mm (1 mil), more preferably, within 0.013 mm (0.5 mil).

Suitable polymeric materials for extrusion from dies described herein, methods described herein, and for composite layers described herein include thermoplastic resins comprising polyolefins (e.g., polypropylene and polyethylene), polyvinyl chloride, polystyrene, nylons, polyesters (e.g., polyethylene terephtalate) and copolymers and blends thereof. Suitable polymeric materials for extrusion from dies described herein, methods described herein, and for composite layers described herein also include elastomeric materials (e.g., ABA block copolymers, polyurethanes, polyolefin elastomers, polyurethane elastomers, metallocene polyolefin elastomers, polyamide elastomers, ethylene vinyl acetate elastomers, and polyester elastomers). Exemplary adhesives for extrusion from dies described herein, methods described herein, and for composite layers described herein include acrylate copolymer pressure sensitive adhesives, rubber based adhesives (e.g., those based on natural rubber, polyisobutylene, polybutadiene, butyl rubbers, styrene block copolymer rubbers, etc.), adhesives based on silicone polyureas or silicone polyoxamides, polyurethane type adhesives, and poly(vinyl ethyl ether), and copolymers or blends of these. Other desirable materials include, for example, styrene-acrylonitrile, cellulose acetate butyrate, cellulose acetate propionate, cellulose triacetate, polyether sulfone, polymethyl methacrylate, polyurethane, polyester, polycarbonate, polyvinyl chloride, polystyrene, polyethylene naphthalate, copolymers or blends based on naphthalene dicarboxylic acids, polyolefins, polyimides, mixtures and/or combinations thereof.

In some embodiments, the first and second polymeric materials each have a different refractive index (i.e., one relatively higher to the other).

In some embodiments, then first and/or second polymeric material comprises a colorant (e.g., pigment and/or dye) for functional (e.g., optical effects) and/or aesthetic purposes (e.g., each has different color/shade). Suitable colorants are those known in the art for use in various polymeric materials. Exemplary colors imparted by the colorant include white, black, red, pink, orange, yellow, green, aqua, purple, and blue. In some embodiments, it is desirable level to have a certain degree of opacity for the first and/or second polymeric material. The type of colorants used and the desired degree of opacity, as well as, for example, the size and shape of the particular zone of the composite article effects the amount of colorant used. The amount of colorant(s) to be used in specific embodiments can be readily determined by those skilled in the art (e.g., to achieve desired color, tone, opacity, transmissivity, etc.). If desired, the first and second polymeric materials may be formulated to have the same or different colors.

More specifically, for example, for embodiments such as generally shown in FIG. 5, desirable polymers include polyolefin elastomers (e.g., from Dow Chemical, Midland, Mich., under the trade designation "ENGAGE" and Clarified Polypropylene Random copolymer (e.g., from Lyondell Basell Industries, Rotterdam, The Netherlands, under the trade designation "PROFAX"). Other desirable materials include, for example, styrene-acrylonitrile copolymers, cellulose acetate butyrate polymers, cellulose acetate propionate polymers, cellulose triacetate polymers, polyether sulfone polymers, polymethyl methacrylate polymers, polyurethane polymers, polyesters, polycarbonate polymers, polyvinyl chloride polymers, polystyrene polymers, polyethylene naphthalate polymers, copolymers or blends based on naphthalene dicarboxylic acids, polyolefins, polyimides, mixtures and/or combinations thereof.

Exemplary uses for embodiments such as shown generally in FIG. 5 include document privacy articles or shields, constructions having two different adhesive materials, and light control films also known as light collimating film, which is an optical film that is configured to regulate the transmission of light. Light control films typically include a light transmissive film having a plurality of parallel grooves wherein the grooves are formed of a light-absorbing material. Light control films can be placed proximate a display surface, image surface, or other surface to be viewed. Typically, at normal incidence, (i.e., 0 degree viewing angle) where a viewer is looking at an image through the light control film in a direction that is perpendicular to the film surface, the image is viewable. As the viewing angle increases, the amount of image light transmitted through the light control film decreases until a viewing cutoff angle is reached where substantially all the image light is blocked by the light-absorbing material and the image is no longer viewable. This can provide privacy to a viewer by blocking observation by others that are outside a typical range of viewing angles. The viewing angle can be further modified by having clear zones at two different lengths of clear zones. As a result of the two lengths of clear zones, the viewing cutoff angle is seen at two different angles.

To provide desired privacy effect, one of the first and second zones is typically transparent and the other zone is non-transparent. By transparent is meant that the respective zone is sufficiently transmissive to visible light to permit an observer to read underlying material through the respective zone with the unaided human eye. The other, non-transparent, zone is translucent or even preferably opaque (i.e., it is insufficiently transmissive to visible light to permit an observer to read underlying material through the respective zone with the unaided human eye).

As mentioned above, embodiments of composite layers produced with the dies and method described herein are well suited for use in document privacy articles or shields which as used herein refer to articles adapted to be used with a document (e.g., a sheet or stack of sheets of paper with indicia thereon), a credit card, etc., to permit the document to be seen from selected viewing orientations (e.g., by a passenger (i.e., the intended reader), seated in an airplane, but not from other view positions (e.g., by a fellow passenger on in an adjacent seat)). The privacy article is adapted to be used with the document (e.g., cut to convenient size to be laid on the face of a document, provided with an optional cavity to receive the document, provided with an optional clip or adhesive to be secured to the document, etc. in such a manner that the face of the document can be seen through the composite layer from the selected viewing orientation. In some instances the privacy article will consistent essentially of the composite layer, in other instances the privacy article may comprise additional components or members where the composite layer constitutes a privacy panel providing the selective viewing orientation described herein.

One exemplary use of composite layer 80 shown in FIG. 5, for example, is a rectangular sheet wherein material 82a is a substantially transparent polymer and material 82b is opaque. Such a layer can be used as a privacy article. By substantially transparent is meant that polymer permits light to be transmitted therethrough such that an observer can look through material 82a to see matter on the opposite side of the composite layer (e.g., read a document on which the composite layer has been placed).

Using embodiments of composite layers described herein, privacy articles can be made in a variety of desired configurations. Privacy articles described herein comprise, and may consist essentially of, composite layers described herein. For instance, composite layer 80 can be formed in or cut to a convenient size (e.g., the size of letter, legal or A4 paper), and then simply laid over a paper and used as a personal privacy article while reading the paper. In most typical embodiments of this application, the machine direction of the composite layer 80 will be oriented to parallel the long direction of the paper if the paper is printed in conventional portrait orientation (and as will be understood, perpendicularly thereto if the privacy article is intended to be used with documents printed in landscape format). In this manner, the privacy article permits the document to be read by the person holding it but prevents the document from being read by persons sitting adjacent to the reader (e.g., fellow passengers on an airplane). As will be understood, control of the range of the viewing zone through which an underlying document can be read can be readily controlled by selecting the magnitude of the width of the substantially transparent material 82a, and, perpendicular thereto, the height of opaque material 82b. Using wider substantially transparent material 82a will result in wider orientations through which the underlying document may be read (and thus lessened privacy) whereas using greater height of opaque material 82b will result in narrower orientation through which the underlying document may be read (and thus increased privacy). Those skilled in the art will be able to readily select materials and configurations for composite films described herein to result in desired performance.

In some embodiments, the privacy article will be substantially continuous. In other embodiments the article may have openings or cut out portions therein. For instance, some embodiments may be made with a narrow cut-out portion running partially across the sheet in the cross direction that permits direct access to the underlying document (e.g., allowing marking of the document with a writing instrument such as a pen or highlighter without completely unshielding the document).

Figure 10:
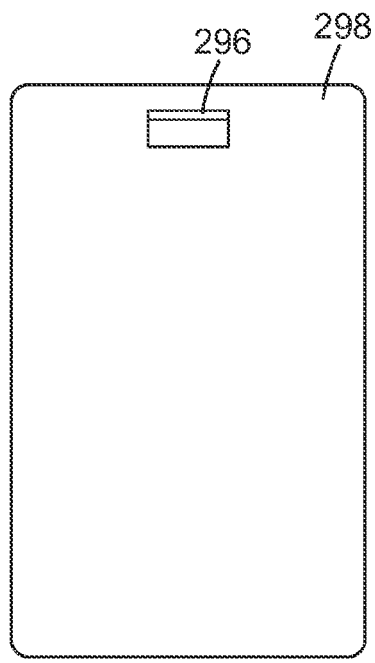
FIG. 10 is a plan view of an illustrative privacy article having a clamp for securing the document to be protected.

Referring now to FIG. 10, an exemplary privacy article is illustrated. A clamp 296 is attached to the bottom side of sheet 298 of composite layer 80 shown in FIG. 5. Clamp 296 can releasably hold a document (not shown) to be protected in place so as to free up the user's hands. Alternatively, adhesive (not shown) (e.g., a repositionable adhesive) may be provided on the bottom side of sheet 298 to releasably secure the sheet to a document. In another embodiment in accordance with the disclosure, a composite sheet produced as described herein may be used with conventional clip board with the sheet being secured in place over the paper(s) secured on the clip board.

Illustrative examples of configurations of privacy shields or articles which may be made using composite films produced with dies described herein include simple sheets, optionally having one or more tabs, clips, etc., pockets optionally having two or more chambers, credit card holders, file folders, portfolio holders, pouches with optional closure and/or flaps, etc. When coupled with a document having indicia on a first surface thereof by positioning the composite film on (i.e., in direct contact with or in close proximity thereto in front of the first surface such that one must look through the film to read the indicia), an assembly comprising a privacy assured document is created.

Figure 11:
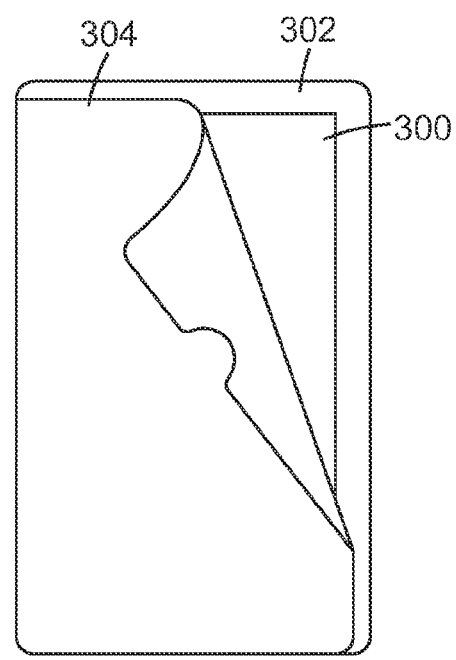
FIG. 11 is a plan view of an illustrative privacy article constructed as a pocket for receiving the document to be protected.

Referring now to FIG. 11, an exemplary privacy article is illustrated. Document 300 to be protected from prying eyes is enclosed within pocket 302, wherein a least a viewing side 304 is formed, for example, from composite layer 80 shown in FIG. 5. In perhaps the most convenient embodiments of this application, the machine direction of viewing side 304 is oriented to parallel the long direction of paper 300 because documents are more commonly printed in portrait orientation, although as discussed above, the composite of view side 304 may be oriented with its machine direction perpendicular to the long direction of paper 300 for use with documents printed in landscape orientation.

Figure 12:
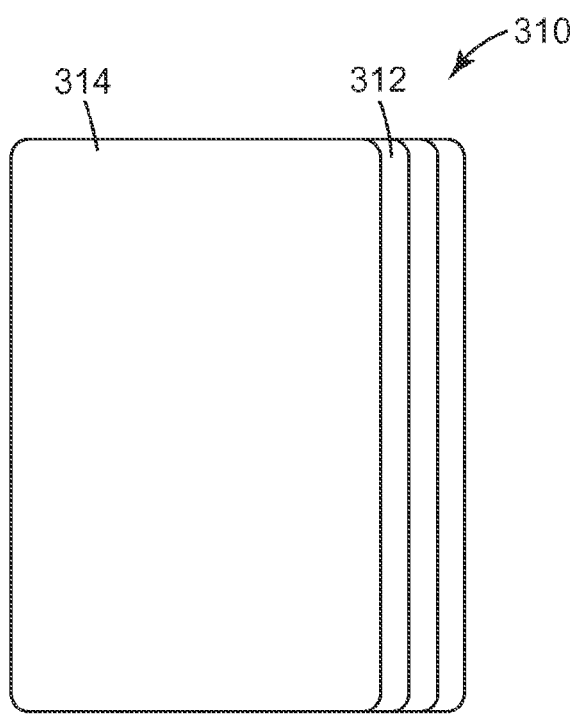
FIG. 12 is a plan view of an illustrative privacy article constructed with multiple side-by-side coextruded sheets attached at a hinge and capable of receiving multiple documents to be protected.

Referring now to FIG. 12, another exemplary privacy article is illustrated. Privacy article 310 includes multiple sheets 312 formed from composite layer 80 shown in FIG. 5, all of a slightly different width. These are attached together, for example, with a living hinge (i.e., a thin flexible web material that joins two relatively rigid bodies together) along side 314.

Figure 13:
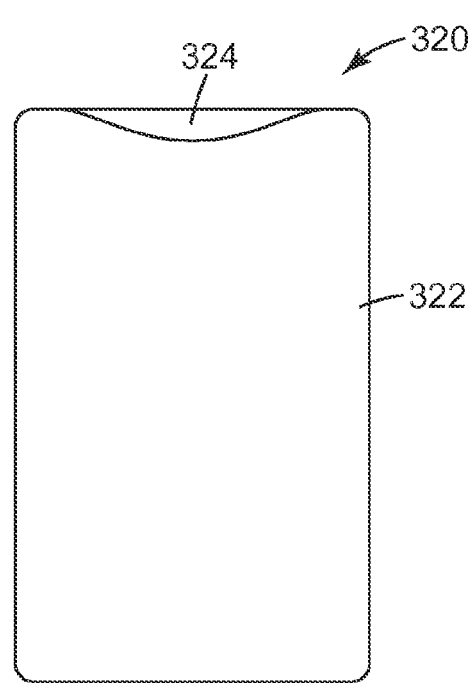
FIG. 13 is a plan view of an illustrative privacy article n adapted to protect a single credit card.

Referring now to FIG. 13, another exemplary privacy article 320 is adapted to protect a credit card as illustrated. At least top surface 322, and conveniently bottom surface 324 as well is formed from composite layer 80 shown in FIG. 5. This construction allows the owner to read his credit card numbers while concealing them from those nearby.

Referring now to FIG. 14, another exemplary privacy article 330 is adapted to protect credit cards as illustrated, except that this embodiment holds multiple cards and is adapted by hinged support panel 332 to be received within a wallet with panel 332 fitting within the recesses commonly found in wallets for such purposes.

Figure 15:
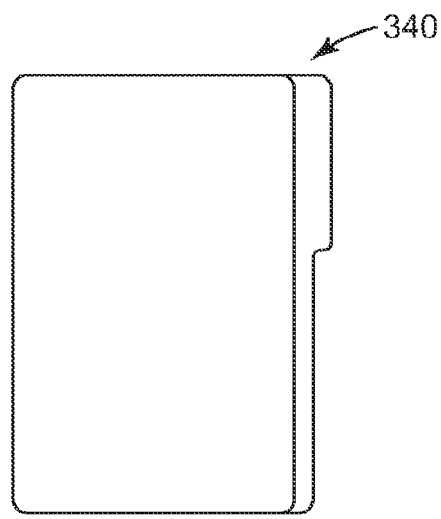
FIG. 15 is a plan view of an illustrative privacy article sized and shaped like a standard filing folder.

Referring now to FIG. 15, another exemplary privacy article 340 constructed in the shape of a conventional file folder is illustrated. The ability to discretely view the contents of the top document within article 340 can be a convenience if multiple folders are in use in a populated environment.

Figure 16:
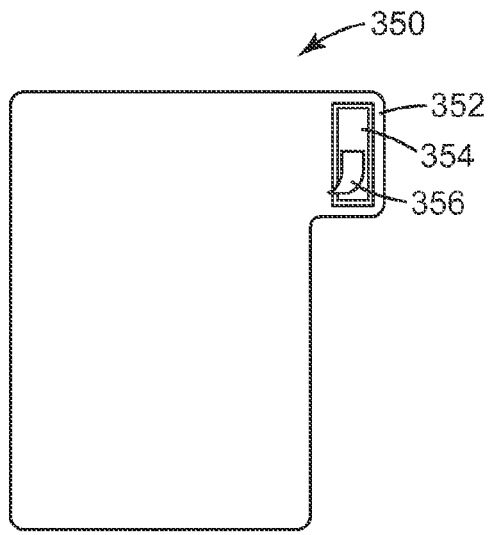
FIG. 16 is a plan view of an illustrative privacy article having a flange to support a dispenser of repositionable adhesive flags.
Figure 17:
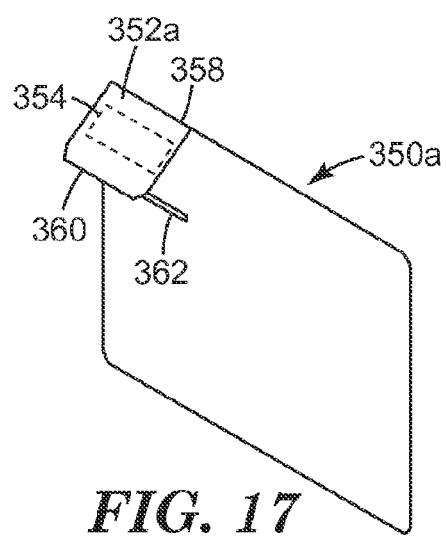
FIG. 17 is a perspective view of an alternate embodiment of the privacy article of FIG. 16.

It is contemplated that diverse flanges and/or recesses can be provided on privacy articles according to the present disclosure to improve their convenience for users. These features can accomplish that by supporting common office supply tools such as highlighter pens, paperclips, and repositionable flags. For example, and referring now to FIG. 16, privacy article 350 has an extended flange 352 with a dispenser 354 for repositionable tape flags 356 mounted thereon. A variant privacy article 350a is illustrated in FIG. 17 wherein the extended flange 352a is mounted on a living hinge 358 so that the extended flange 352a can fold with its leading edge 360 can be received in slot 362 for convenient storage.

Figure 18:
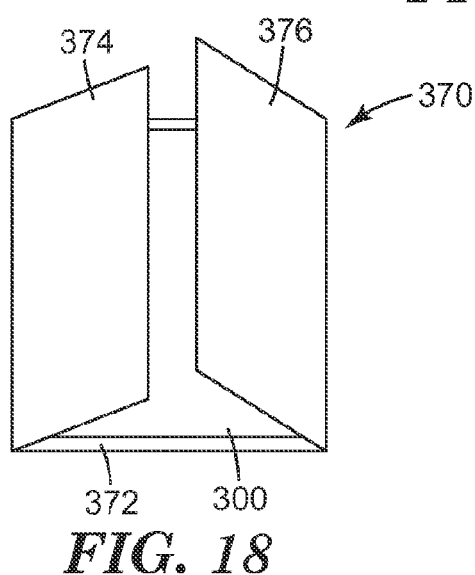
FIG. 18 is a perspective view of an illustrative 3-fold embodiment of a privacy article.

Referring now to FIG. 18, another exemplary privacy article 370 is illustrated. Privacy article 370 has a back 372 hinged to two side panels 374 and 376 which can independently open to provide quick access to document 300 (e.g., to write thereon or remove it while providing desired privacy when closed).

Those skilled in the art can make privacy articles described herein in a variety of forms. The composite extruded film produced herein may be made in flexible or rigid form as desired. If desired, the privacy article may have alphanumeric or other indicia thereon. In some embodiments, they may be provided with print receptive coatings so as to be capable of being written on. Advantages of the present disclosure include that composite films having uniform, desired privacy control properties can be made inexpensively including films that are suitable for use in secured document assemblies for many different configurations as desired.

In some embodiments, the first and/or second polymeric materials comprise adhesive material. In some embodiments, the first adhesive material has a first release, wherein the first and second release have different release properties, and the second adhesive material has a second release, wherein the first and second release have different release properties.

In some exemplary embodiments employing adhesives, with different adhesive properties (e.g., one has relatively strong adhesive characteristics, and the other relatively weak adhesive characteristics). The type of adhesive functionality could include, for example, the adhesives having the different adhesive properties be tailored together to provide various adhesions to a desire surface (e.g., to skin and/or other articles; good adhesion to plastic (e.g., PVC or other tubing, silicone). The adhesive combinations could also be tailored, for example, to be relatively gentle to skin or to remove a minimal amount of skin cells.

For curable adhesives, curing can be done using conventional techniques (e.g., thermal, UV, heat or energy beam). If the adhesive is cured by electron beam, for example, the acceleration voltage of the beam can also be set up such that the top portion of the adhesive is preferentially cured so the adhesive on the bottom maintains more of its adhesion properties.

Exemplary Embodiments

1. A composite layer comprising a plurality of longitudinal first zones comprised of a first polymeric material alternating with a plurality of longitudinal second zones comprised of a second polymeric material such that one first zone is disposed between two adjacent second zones, wherein the zones are generally parallel to one another, and at least one of each first zone or each second zone has a maximum width dimension of not greater than 2 mm (optionally, not greater than 1.5 mm, 1 mm, 0.75 mm, 0.5 mm, or even not greater than 0.2 mm; optionally, in a range from 0.25 mm to 1 mm), wherein adjacent first and second zones have an average pitch, wherein for the composite layer there is an average of said average pitches, and wherein the average pitch for any adjacent first and second zones is within 20 (optionally 15, 10, or even less than 5) percent of said average of said average pitches.

2. The composite layer of exemplary embodiment 1, wherein each first zone has an average width, wherein there is an average width of the first zones, and wherein said average width dimension of first zones is within 20 (optionally, 15, 10, or even within 5) percent of said average width for the first zones.

3. The composite layer of either exemplary embodiment 1 or 2, wherein there are at least 10 (optionally, at least 15, 20, 25, 30, 35, 40, 45, 50, 55, 60, 65, 70, 75, 80, 85, 90, 95, or even at least 100) distinct first and second zones per cm.

4. The composite layer of any preceding exemplary embodiment, wherein, by volume, the ratio of the second polymeric material to the first polymeric material is at least 5:1 (optionally, 10:1, 20:1, 25:1, 50:1, 75:1, or even 100:1).

5. The composite layer of any preceding exemplary embodiment, wherein the first polymeric material comprises first adhesive material.

6. The composite layer of exemplary embodiment 5, wherein the first adhesive material has a first release.

7. The composite layer of any preceding exemplary embodiment, wherein the second polymeric material comprises second adhesive material.

8. The composite layer of exemplary embodiment 7, wherein the second adhesive material has a second release.

9. A privacy article comprising the composite layer of any of exemplary embodiments 1 to 8.

10. An assembly comprising a document having indicia on a first surface thereof and a privacy article of exemplary embodiment 9, wherein said privacy article is positioned on said first surface.

11. A composite layer comprising:
a first plurality of longitudinal first zones comprised of a first polymeric material alternating with a plurality of longitudinal second zones comprised of a second polymeric material such that one first zone is disposed between two adjacent second zones, wherein the zones are generally parallel to one another, and at least one of each first zone or each second zone has a maximum width dimension of not greater than 2 mm (optionally, not greater than 1.5 mm, 1 mm, 0.75 mm, 0.5 mm, or even not greater than 0.2 mm; optionally, in a range from 0.25 mm to 1 mm), wherein adjacent first and second zones in the first plurality have an average pitch, and wherein for the first plurality there is an average of said average pitches; and
a second plurality of longitudinal first zones comprised of the first polymeric material alternating with a plurality of longitudinal second zones comprised of the second polymeric material such that one first zone is disposed between two adjacent second zones, wherein the zones are generally parallel to one another, and at least one of each first zone or each second zone has a maximum width dimension of not greater than 2 mm (optionally, not greater than 1.5 mm, 1 mm, 0.75 mm, 0.5 mm, or even not greater than 0.2 mm; optionally, in a range from 0.25 mm to 1 mm), wherein adjacent first and second zones in the first plurality have an average pitch, and wherein for the second plurality there is an average of said average pitches,
wherein for the composite layer there is an average of said average pitches of the first and second average pitches, wherein the average pitch for adjacent first and second zones in each of the first and second plurality is within 20 (optionally 15, 10, or even less than 5) percent of said average of said average pitches, and wherein there is a third zone comprising the first or second polymeric material separating the first and second pluralities having a width wider than said average of said average pitches.

12. The composite layer of exemplary embodiment 11, wherein each first zone has an average width, wherein there is an average width of the first zones, and wherein said average width dimension of first zones is within 20 (optionally, 15, 10, or even within 5) percent of said average width for the first zone.

13. The composite layer of either exemplary embodiment 11 or 12, wherein there are at least 10 (optionally, at least 15, 20, 25, 30, 35, 40, 45, 50, 55, 60, 65, 70, 75, 80, 85, 90, 95, or even at least 100) distinct first and second zones per cm.

14. The composite layer of any of exemplary embodiments 11 to 13, wherein, by volume, the ratio of the second polymeric material to the first polymeric material is at least 5:1 (optionally, 10:1, 20:1, 25:1, 50:1, 75:1, or even 100:1).

15. The composite layer of any of exemplary embodiments 11 to 14, wherein the first polymeric material comprises first adhesive material.

16. The composite layer of exemplary embodiment 15, wherein the first adhesive material has a first release.

17. The composite layer of any of exemplary embodiments 11 to 16, wherein the second polymeric material comprises adhesive material.

18. The composite layer of exemplary embodiment 17, wherein the second adhesive material has a second release.

19. A privacy article comprising the composite layer of any of exemplary embodiments 11 to 18.

20. An assembly comprising a document having indicia on a first surface thereof and a privacy article of exemplary embodiment 19, wherein said privacy article is positioned on said first surface.

Advantages and embodiments of this disclosure are further illustrated by the following examples, but the particular materials and amounts thereof recited in these examples, as well as other conditions and details, should not be construed to unduly limit this disclosure. All parts and percentages are by weight unless otherwise indicated.

EXAMPLE

A co-extrusion die as generally depicted in FIG. 1, and assembled with a 4-shim repeating pattern as generally illustrated in FIG. 4, was prepared. The thickness of the shims in the repeat sequence was 5 mils (0.127 mm) for the shims with connection to the first cavity, 3 mils (0.076 mm) for the shims with connection to the second cavity, and 2 mils (0.05 mm) for the spacers which had no connection to either cavity. The shims were formed from stainless steel, with the perforations cut by a numerical control laser cutter.

The inlet fittings on the two end blocks were each connected to a conventional single-screw extruder. A chill roll was positioned adjacent to the distal opening of the co-extrusion die to receive the extruded material. The extruder feeding the first cavity (Polymer A in the Table 1, below) was loaded with polyethylene pellets (obtained under the trade designation "ENGAGE PE 8402" from Dow Corporation, Midland, Mich.).

TABLE 1

|  | Example |
| --- | --- |
| kg/hr of Polymer A | 2.5 |
| kg/hr of Polymer B | 0.14 |
| Polymer A Barrel 1 Temp., ° C. | 177 |
| Polymer A Remaining Barrel Temp., ° C. | 199 |
| Polymer A Melt Stream Temp., ° C. | 199 |
| Polymer B Barrel 1 Temp., ° C. | 177 |
| Polymer B Remaining Barrel Temp., ° C. | 199 |
| Polymer B Melt Stream Temp., ° C. | 199 |
| Die Temp., ° C. | 199 |
| Chill roll Temp., ° C. | 60 |
| Chill roll surface speed, m/min. | 1.2 |

The extruder feeding the second cavity (Polymer B in the Table 1, above) was loaded with polyethylene pellets ("ENGAGE PE 8402") and 5% by weight black polypropylene color concentrate (obtained from Clariant Corporation, Minneapolis, Minn.). Other process conditions are listed in Table 1, above. A cross-section of the resulting 0.76 mm (30 mils) thick extruded composite layer is shown in FIG. 5 (Polymer A 82a and Polymer B 82b).

Using an optical microscope, the length, $p_5$, as shown in FIG. 5 was measured. The results are shown in Table 2, below.

TABLE 2

| Measurement | $p_5$, micrometer |
| --- | --- |
| 1 | 290 |
| 2 | 283 |
| 3 | 298 |
| 4 | 295 |
| 5 | 280 |
| 6 | 305 |
| 7 | 276 |
| 8 | 304 |
| 9 | 295 |
| 10 | 289 |
| Average of the 10 measurements | 291 |

Foreseeable modifications and alterations of this disclosure will be apparent to those skilled in the art without departing from the scope and spirit of this disclosure. This disclosure should not be restricted to the embodiments that are set forth in this application for illustrative purposes.

What is claimed is:

1. A composite layer comprising a plurality of longitudinal first zones comprised of a first polymeric material alternating with a plurality of longitudinal second zones comprised of a second polymeric material such that one first zone is disposed between two adjacent second zones, wherein the zones are generally parallel to one another, and at least one of each first zone or each second zone has a maximum width dimension of not greater than 2 mm, wherein adjacent first and second zones have an average pitch, wherein for the composite layer there is an average of said average pitches, and wherein the average pitch for any adjacent first and second zones is within 20 percent of said average of said average pitches.

2. The composite layer of claim 1, wherein each first zone has an average width, wherein there is an average width of the first zones, and wherein said average width dimension of first zones is within 20 percent of said average width for the first zones.

3. The composite layer of claim 1, wherein there are at least 10 distinct first and second zones per cm.

4. The composite layer of claim 1, wherein the first polymeric material comprises first adhesive material.

5. A privacy article comprising the composite layer of claim 1.

6. A composite layer comprising:
a first plurality of longitudinal first zones comprised of a first polymeric material alternating with a plurality of longitudinal second zones comprised of a second polymeric material such that one first zone is disposed between two adjacent second zones, wherein the zones are generally parallel to one another, and at least one of each first zone or each second zone has a maximum width dimension of not greater than 2 mm, wherein adjacent first and second zones in the first plurality have an average pitch, and wherein for the first plurality there is an average of said average pitches; and
a second plurality of longitudinal first zones comprised of the first polymeric material alternating with a plurality of longitudinal second zones comprised of the second polymeric material such that one first zone is disposed between two adjacent second zones, wherein the zones are generally parallel to one another, and at least one of each first zone or each second zone has a maximum width dimension of not greater than 2 mm, wherein adjacent first and second zones in the first plurality have an average pitch, and wherein for the second plurality there is an average of said average pitches,
wherein for the composite layer there is an average of said average pitches of the first and second average pitches, wherein the average pitch for adjacent first and second zones in each of the first and second plurality is within 20 percent of said average of said average pitches, and wherein there is a third zone comprising the first or second polymeric material separating the first and second pluralities having a width wider than said average of said average pitches.

7. The composite layer of claim 6, wherein each first zone has an average width, wherein there is an average width of the first zones, and wherein said average width dimension of first zones is within 20 percent of said average width for the first zone.

8. The composite layer of claim 6, wherein there are at least 10 distinct first and second zones per cm.

9. The composite layer of claim 6, wherein the first polymeric material comprises first adhesive material.

10. A privacy article comprising the composite layer of claim 6.

11. The composite layer of claim 1, wherein, by volume, the ratio of the second polymeric material to the first polymeric material is at least 5:1.

12. The composite layer of claim 4, wherein the first adhesive material has a first release.

13. The composite layer of claim 12, wherein the second polymeric material comprises second adhesive material.

14. The composite layer of claim 13, wherein the second adhesive material has a second release.

15. An assembly comprising a document having indicia on a first surface thereof and a privacy article of claim 5, wherein said privacy article is positioned on said first surface.

16. The composite layer of claim 6, wherein, by volume, the ratio of the second polymeric material to the first polymeric material is at least 5:1.

17. The composite layer of claim 6, wherein the first adhesive material has a first release.

18. The composite layer of claim 17, wherein the second polymeric material comprises adhesive material.

19. The composite layer of claim 18, wherein the second adhesive material has a second release.

20. An assembly comprising a document having indicia on a first surface thereof and a privacy article of claim 10, wherein said privacy article is positioned on said first surface.

* * * * *

UNITED STATES PATENT AND TRADEMARK OFFICE
CERTIFICATE OF CORRECTION

| | | |
|---|---|---|
| PATENT NO. | : 8,758,882 B2 | Page 1 of 1 |
| APPLICATION NO. | : 13/635609 | |
| DATED | : June 24, 2014 | |
| INVENTOR(S) | : Ronald Ausen | |

It is certified that error appears in the above-identified patent and that said Letters Patent is hereby corrected as shown below:

In the Specification

Column 8
Line 65, delete "machining" and insert -- machining. --, therefor.

Signed and Sealed this
Twenty-first Day of October, 2014

Michelle K. Lee
*Deputy Director of the United States Patent and Trademark Office*